D. P. RANDALL.
Animal-Poke.
No. 206,260.    Patented July 23, 1878.
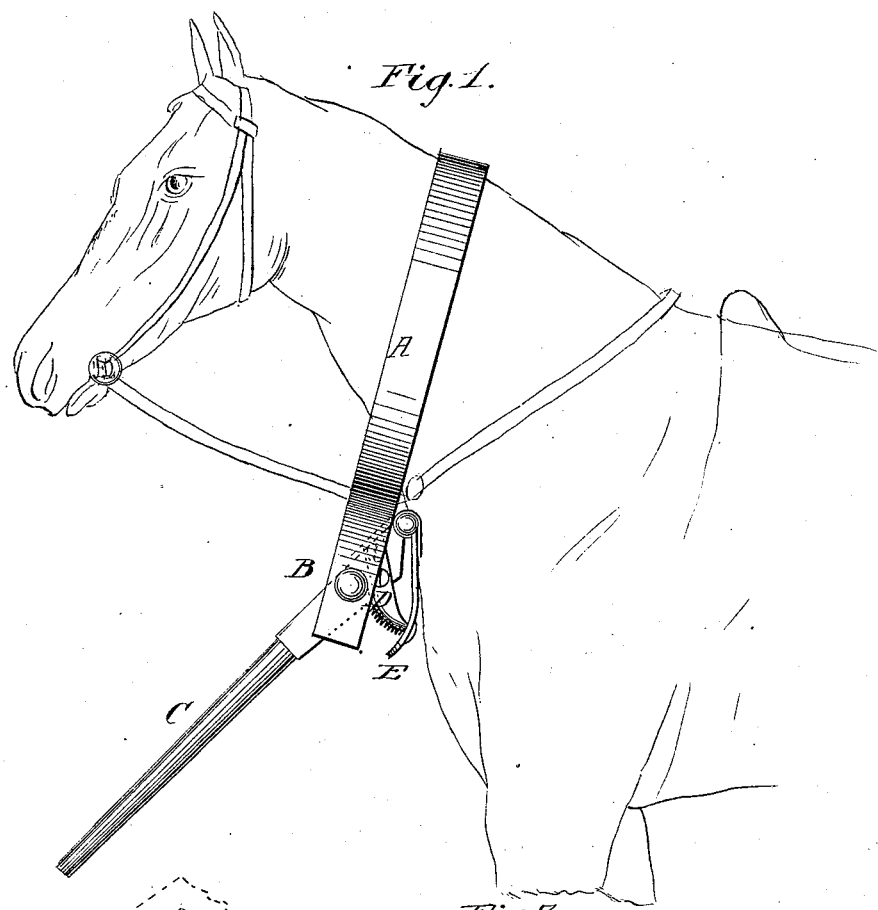
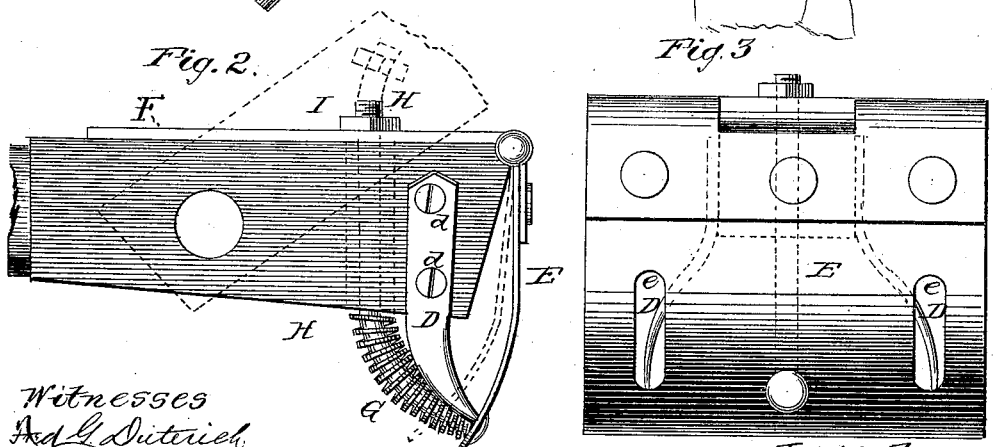

UNITED STATES PATENT OFFICE.

DELANO P. RANDALL, OF SMITH ROAD, OHIO.

IMPROVEMENT IN ANIMAL-POKES.

Specification forming part of Letters Patent No. 206,260, dated July 23, 1878; application filed September 12, 1877.

*To all whom it may concern:*

Be it known that I, DELANO P. RANDALL, of Smith Road, in the county of Medina and State of Ohio, have invented certain new and useful Improvements in Horse-Pokes or Animal-Pokes; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention or improvement in horse-pokes consists of a novel construction and arrangement of pricks or barbs, in combination with a hinged and slotted guard and a coiled spring, all of which will be fully understood by the following description.

In the accompanying drawings, Figure 1 represents a side view of my horse-poke upon the neck of a horse. Fig. 2 is a larger side view of part of the poke, showing the motion of the guard. Fig. 3 is a rear direct view of the hinged guard, showing the slots therein.

The bow A, Fig. 1, is of the usual form, and has a pin, B, for pivoting the pole C in the ordinary manner.

The pricks or barbs D are fastened firmly to the sides of the pole by means of wood-screws $d$, as seen in Fig. 2; and the guard E is hinged to the plate F, which is also fastened to the pole by means of wood-screws. This guard has slots $e$, for the points of the barbs D to pass through and prick the horse when he thrusts the poke against the fence.

A strong coiled spring, G, working on a curved guide-bolt, H, presses the guard back, so as to prevent the pricks or barbs from pricking the horse, only when he thrusts the pole of the poke against the fence. The base of this coiled spring is in a hole or socket in the pole, and by means of the nut I upon the bolt H the guard may be adjusted, so that the spring will keep the same clear of the points of the barbs, as shown in Fig. 1; but when the horse thrusts the pole of the poke against the fence the guard exposes the points of the barbs, as indicated by dotted lines in Fig. 2, said points being thrust through the slots seen in Fig. 3, and thus pricking the horse.

This construction of poke is very simple, cheap, and durable, and may be used on various different animals.

Having described my invention, I claim—

1. The pricks or barbs D, firmly attached to the pole C, in combination with the hinged guard E, secured in place by plate F, substantially as set forth.

2. The combination of the pricks or barbs D with the hinged guard E and spring G, substantially as set forth.

3. The curved guide-bolt H and the spring G, socketed in the pole C, in combination with the hinged guard E, slots $e$, and barbs D, substantially as and for the purposes set forth.

In testimony that I claim the foregoing as my own I affix my signature in presence of two witnesses.

DELANO P. RANDALL.

Witnesses:
C. S. GANYARD,
P. A. GANYARD.